3,324,910
SQUARE HOLE SAW
Elmer M. Benedict, 145 Barrett St.,
Schenectady, N.Y. 12305
Filed May 11, 1965, Ser. No. 455,014
2 Claims. (Cl. 145—130)

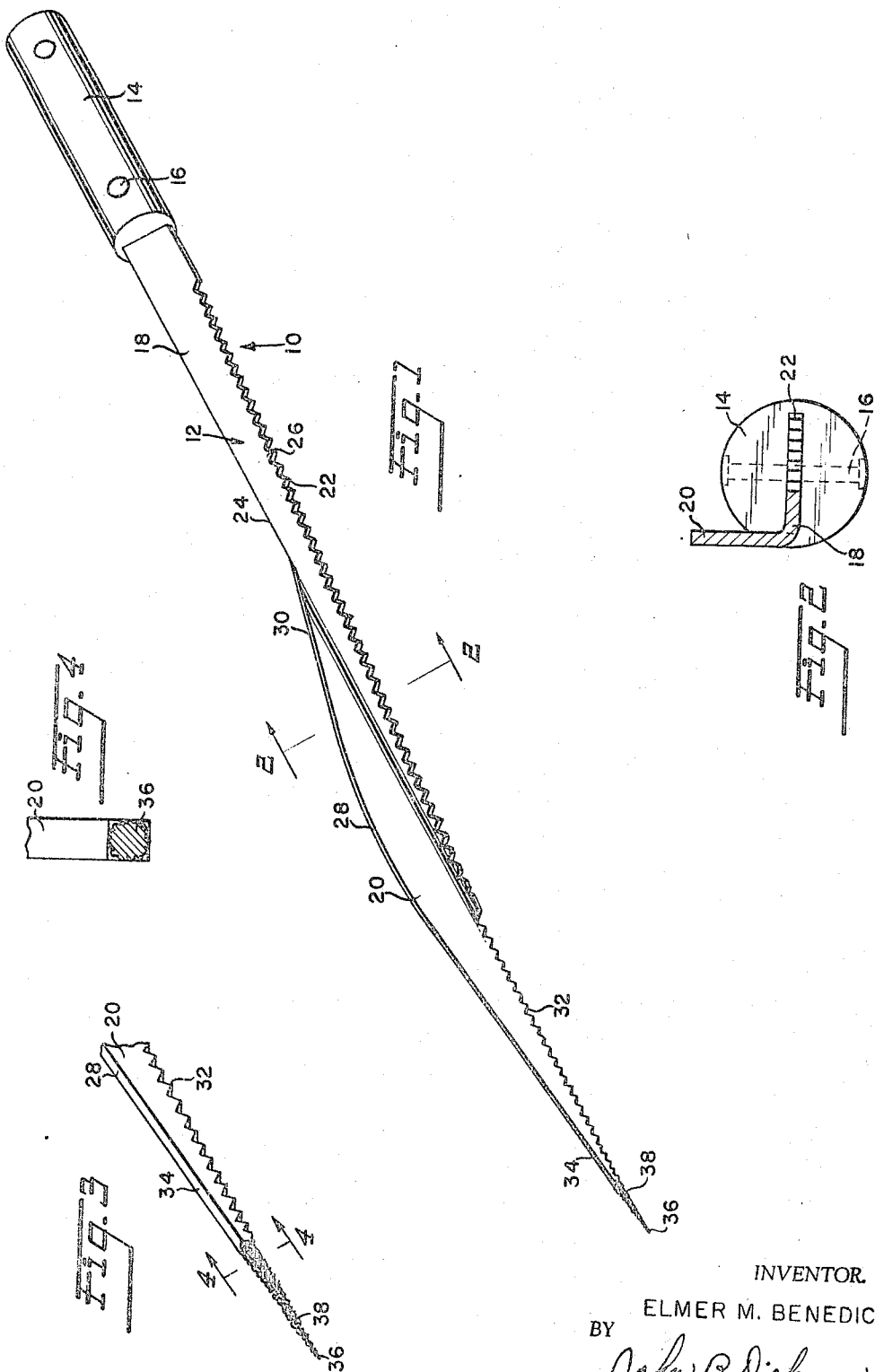

The present invention generally relates to a reciprocating saw blade and more particularly to a blade having longitudinally extending portions disposed in perpendicular planes and provided with saw teeth disposed in such planes for more expeditiously forming square holes or holes of other shapes which have angled corners.

An object of the present invention is to provide a saw blade as set forth in the preceding paragraphs which has portions has a tapering back edge to enable the portions of the blade to more easily enter and exit from the cut.

Another object of the invention is to provide a saw blade as set forth in the preceding paragraphs which has a tapering tip forming a point having circular rasping teeth thereon to enable the saw blade to penetrate relatively thin work or sheet material such as gypsum wallboard, plywood and the like without requiring a starting hole to be bored first.

A further object of this invention is to provide a simplified saw that is long lasting, effective for its purposes and relatively inexpensive to manufacture.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a perspective view of the saw of the present invention;

FIGURE 2 is a transverse sectional view, on an enlarged scale, taken along section line 2—2 of FIGURE 1;

FIGURE 3 is a fragmental perspective view of the serrated tip; and

FIGURE 4 is a transverse sectional view, on an enlarged scale, taken along section line 4—4 of FIGURE 3.

Referring now to the drawings in detail, the saw 10 includes an elongated blade 12 having an axial handle 14 secured to one end thereof such as by rivets 16 thereby enabling the blade 12 to be reciprocated in a conventional manner.

The blade 12 includes an axially inner portion 18 and an axially outer portion 20 in perpendicular relation thereto. The inner portion 18 is tapered by converging the toothed edge 22 towards the back edge 24. The teeth 26 on the toothed edge 22 may be of any shape, size and set depending upon the intended uses for the saw. Also, the shape and size of the handle 14 may vary to suit individual preferences and may be secured in place by any suitable means.

The outer portion 20 has a rounded back edge 28 which tapers at 30 where it joins with inner portion 18 for enabling the blade to more easily enter a cut. The other edge of the outer portion 20 has teeth 32 formed therein which may vary in size and shape and which are arranged in perpendicular relation to the teeth 26 as illustrated in FIGURE 1. Also, the edge 28 tapers outwardly at 34 and terminates in a tapered and sharpened tip 36 that is circular in cross sectional configuration and provided with circular or spiral rasping teeth or serrations 38 on the surface thereof. The tip 36 and teeth 38 enable a hole to be formed in various materials such as wallboard of different types without first boring a starting hole after which a square or other shape hole may be formed.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A saw blade comprising an elongated blade member and a handle attached thereto, said blade member having axial inner and outer portions arranged in perpendicular relation with saw teeth along one edge of each portion thereof, said inner portion having a straight back portion and a tapering front toothed portion, said tapering toothed portion extending from its widest point adjacent the handle to a junction point midway of the perpendicular outer portion, said outer portion having a straight front toothed portion beginning at the junction point of the toothed inner portion and terminating in a sharp cutting point, and a double tapered back portion tapering from its widest point adjacent the junction of the toothed portions forwardly to the pointed end and backwardly to a junction point with the inner portion of the blade, whereby the blade will be freely movable throughout it's length in the saw cut without jamming or binding.

2. The saw blade as set forth in claim 1 in which the sharp cutting point has rasping teeth adjacent thereto to form a starting hole for said saw blade.

References Cited
UNITED STATES PATENTS

| | | | |
|---|---|---|---|
| 403,031 | 5/1889 | Beckwith | 145—130 |
| 505,712 | 9/1893 | Lofdahl | 145—130 |
| 1,081,135 | 12/1913 | Nelson | 143—134 |
| 1,240,173 | 9/1917 | Brewer. | |

WILLIAM FELDMAN, *Primary Examiner.*

R. V. PARKER, *Assistant Examiner.*